(12) United States Patent
Sasaki et al.

(10) Patent No.: US 11,422,527 B2
(45) Date of Patent: Aug. 23, 2022

(54) AUTOMATIC INSPECTION SYSTEM

(71) Applicant: Hitachi, Ltd., Tokyo (JP)

(72) Inventors: Reiso Sasaki, Tokyo (JP); Kazuo Ono, Tokyo (JP); Takuma Nishimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 16/825,551

(22) Filed: Mar. 20, 2020

(65) Prior Publication Data
US 2020/0393811 A1 Dec. 17, 2020

(30) Foreign Application Priority Data
Jun. 11, 2019 (JP) .............................. JP2019-108540

(51) Int. Cl.
*G06F 8/658* (2018.01)
*G06F 9/44* (2018.01)
(Continued)

(52) U.S. Cl.
CPC .............. *G05B 19/406* (2013.01); *G06N 3/08* (2013.01); *G05B 2219/34465* (2013.01); *G05B 2219/37337* (2013.01)

(58) Field of Classification Search
CPC ......... G10L 15/20; G10L 15/26; G10L 15/10; G10L 15/01; G10L 15/22; G10L 15/30;
(Continued)

(56) References Cited

U.S. PATENT DOCUMENTS 6,262,550 B1 7/2001 Kliman et al.
2015/0277411 A1 10/2015 Nakajima et al.
(Continued)

FOREIGN PATENT DOCUMENTS

JP 2003-87861 A 3/2003
JP 2008-140222 A 6/2008
(Continued)

OTHER PUBLICATIONS

Yaseen et al., IoT based condition monitoring of generators and predictive maintenance, 5 pages (Year: 2017).*
(Continued)

*Primary Examiner* — Thuy Dao
(74) *Attorney, Agent, or Firm* — Crowell & Moring LLP

(57) ABSTRACT

A wireless endpoint provided in an automatic inspection system includes a sound collection unit that collects sounds produced by an inspection target, an analysis unit that analyzes the collected sound and obtains a degree of difference between the collected sound and a normal sound learned in advance as an analysis result, a wireless communication unit that wirelessly transmits data including the analysis result to a wireless base station, and a power supply unit that supplies power to the above units. The wireless base station manages the data received from the wireless endpoint. In response to a request from a monitoring terminal that monitors the status of the inspection target, the wireless base station transmits the analysis result retrieved from the data to the monitoring terminal. The monitoring terminal performs a process of disclosing a status of the inspection target determined from the analysis result.

10 Claims, 13 Drawing Sheets

(51) Int. Cl.
*G06F 9/445* (2018.01)
*G06F 9/455* (2018.01)
*G05B 19/406* (2006.01)
*G06N 3/08* (2006.01)

(58) Field of Classification Search
CPC ... G10L 2015/223; G10L 17/00; G10L 17/22; G10L 17/06; G06F 3/167; G06F 21/0264; G06F 21/32; G06N 7/005; G06N 3/08; H04W 12/06; G05B 19/406; G05B 2219/34465; G05B 2219/37337
See application file for complete search history.

(56) References Cited

U.S. PATENT DOCUMENTS

| | | | | |
|---|---|---|---|---|
| 2017/0332279 | A1* | 11/2017 | Kobayashi | H04W 28/16 |
| 2018/0286407 | A1* | 10/2018 | Katoh | G10L 15/10 |
| 2019/0179297 | A1* | 6/2019 | Kuroda | G05B 23/0254 |

FOREIGN PATENT DOCUMENTS

| | | |
|---|---|---|
| JP | 2009-273113 A | 11/2009 |
| JP | 2015-184987 A | 10/2015 |
| JP | 2016-194447 A | 11/2016 |
| JP | 2017-158139 A | 9/2017 |

OTHER PUBLICATIONS

Japanese Office Action issued in Japanese Application No. 2019-108540 dated Oct. 12, 2021 with English translation (13 pages).

* cited by examiner

AUTOMATIC INSPECTION SYSTEM

BACKGROUND OF THE INVENTION

1. Field of the Invention

The present invention relates to an automatic inspection system.

2. Description of the Related Art

At sites such as power plants, chemical plants, and steel plants, equipment such as motors, compressors, and turbines are installed. As the bearings and insulators become degraded through use of the equipment over time, unusual sounds are produced. In the past, a worker would listen to the operating sounds of equipment such as motors, compressors, and turbines to determine whether the equipment is working normally. However, experience nurtured over many years is required for a worker to be able to differentiate and identify unusual sounds. Furthermore, the burden on the worker is large because the worker has to walk throughout an extensive site and check for unusual sounds with his or her ears. Recently, veteran workers capable of differentiating and identifying unusual sounds have been getting older, and securing new workers is also difficult.

Accordingly, the technology disclosed in JP 2009-273113 A is known as a technology for monitoring a monitoring target. The monitoring device disclosed in JP 2009-273113 A is provided with: a radio for transmitting sound data and image data processed by an information processing machine and receiving control signals for a microphone and a camera; and an antenna connected to the radio.

SUMMARY OF THE INVENTION

The monitoring device of the related art described in JP 2009-273113 A wirelessly transmits sound data of the monitoring target to a monitoring processor in a place distant from the monitoring target. Additionally, the monitoring processor is capable of computing a frequency spectrum from the sound data collected by the monitoring device, and detecting an abnormality in the monitoring target equipment according to a neural network model. Although dependent on factors such as the frequency of the sounds produced by the target being measured, the data size of the sound data transmitted from the monitoring device is large. For this reason, the processing for measuring and analyzing the sound data performed by the monitoring processor is intensive, and the power consumption of the monitoring processing device increases easily.

Also, in the case of installing what is referred to as an add-on sensor device to on-site equipment at a plant, a power outlet is not necessarily available near the equipment, and obtaining a wired power source capable of supplying power to the sensor device is difficult. Consequently, it is necessary to operate the sensor device by using a built-in battery as the power source. However, if the sensor device executes a process having high power consumption (for example, a process of transmitting sound data with a large data size), the built-in battery is depleted quickly and battery replacement becomes more frequent, reducing the utility of the sensor device.

In light of such circumstances, an object of the present invention is to lower the power consumption of a wireless endpoint that collects sounds produced by an inspection target.

According to the present invention, an automatic inspection system includes a wireless endpoint, a wireless base station, and a monitoring terminal. The wireless endpoint includes a sound collection unit that collects a sound produced by an inspection target, an analysis unit that analyzes the collected sound and obtains a degree of difference between the collected sound and a normal sound learned in advance as an analysis result. A wireless communication unit that wirelessly transmits data including the analysis result to the wireless base station, and a power supply unit that supplies power to the sound collection unit, the analysis unit, and the wireless communication unit. The wireless base station receives and manages the data from the wireless endpoint, and in response to a request from the monitoring terminal that monitors a status of the inspection target, transmits the analysis result retrieved from the data to the monitoring terminal. The monitoring terminal performs a process of determining and disclosing the status of the inspection target from the analysis result.

According to the present invention, the wireless endpoint does not transmit data representing the entire frequency band of the sounds collected from the inspection target as an analysis result, but instead transmits the degree of difference from normal sounds as an analysis result to the wireless base station. For this reason, the data size of the data transmitted from the wireless endpoint to the wireless base station can be reduced, and the power consumption of the wireless endpoint can be lowered.

Other objects, configurations and advantages other than those described above will be apparent from the following description of the embodiments.

DESCRIPTION OF THE PREFERRED EMBODIMENTS

Figure 1:
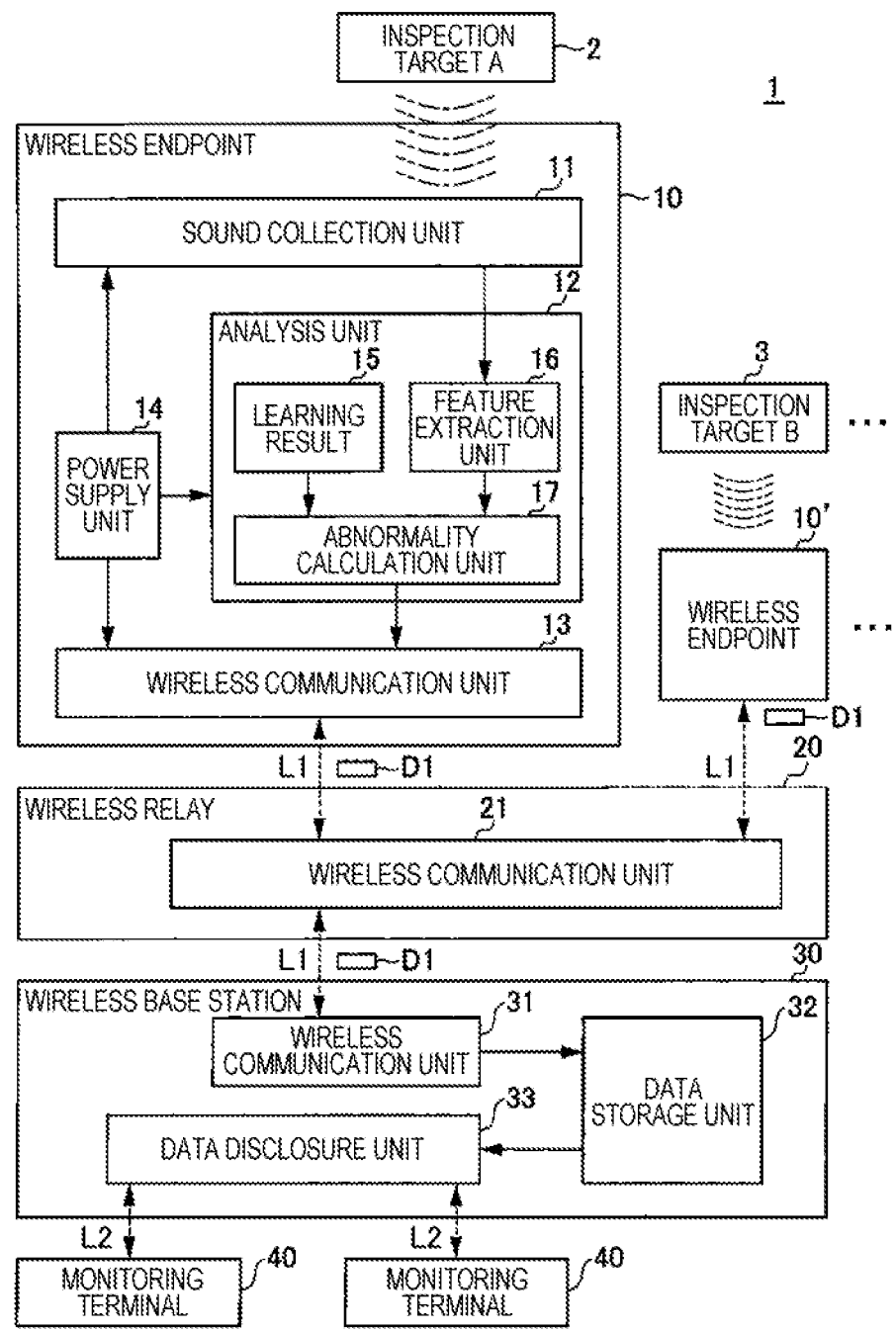
FIG. 1 is a block diagram illustrating an example of an overall configuration of an automatic inspection system according to a first embodiment of the present invention.

Preferred embodiments of the present invention will be described in detail below with reference to the accompanying drawings. In the specification and the drawings, components having substantially the same function or configuration are denoted by the same reference numerals, and redundant description thereof will be omitted.

In the automatic inspection system according to the embodiments described below, sounds (operating sounds) produced by on-site equipment at a plant or the like are collected, the data obtained thereby is analyzed, the degree of difference from normal sounds for the sound data is treated as an analysis result, and the analysis result is transmitted to a wireless base station.

First Embodiment

First, an exemplary configuration and exemplary operation of the automatic inspection system according to the first embodiment of the present invention will be described with reference to FIGS. 1 to 12.

FIG. 1 is a block diagram illustrating an example of an overall configuration of an automatic inspection system 1 according to a first embodiment. The automatic inspection system 1 is applied to a structure such as a plant or building, like a power plant, a chemical plant, a steel plant, or an electrical substation. Additionally, the automatic inspection system 1 is provided with wireless endpoints 10 and 10', a wireless relay 20, a wireless base station 30, and a monitoring terminal 40. Various data can be transmitted and received over a wireless communication channel L1 between the wireless endpoints 10 and 10' and the wireless relay 20, and also between the wireless relay 20 and the wireless base station 30. Also, various data can be transmitted and received over a wireless communication channel L2 between the wireless base station 30 and the monitoring terminal 40. Further, various data may be transmitted and received over a wired communication channel between the wireless base station 30 and the monitoring terminal 40.

The plant is provided with equipment that produce sounds, such as motors, pumps, compressors, turbines, and boilers, for example. At least some of the sound-producing equipment provided in the plant is a target of monitoring (target of inspection) by the automatic inspection system 1. In the following description, the equipment to be monitored is called the "inspection target". The wireless endpoint 10 (one example of an endpoint) is provided in the vicinity of an inspection target A2. The wireless endpoint 10 may be provided in contact with the inspection target A2 or at a distance from the inspection target A2. In addition, different wireless endpoints 10 and 10' may be provided with respect to different inspection targets A2 and B3 in a one-to-one configuration, such that the inspection target A2 and the inspection target B3 are monitored by the wireless endpoint 10 and the wireless endpoint 10', respectively. Also, the wireless endpoints 10 and 10' may be provided with respect to the single inspection target A2, such that different parts of the inspection target A2 are monitored by the wireless endpoint 10 and the wireless endpoint 10', respectively.

Figure 2:
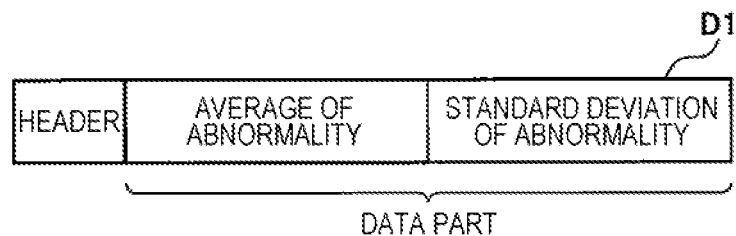
FIG. 2 is a diagram illustrating an exemplary configuration of a packet including an analysis result according to the first embodiment of the present invention.

The wireless endpoint 10 is used as a "sound sensor device" that collects sounds produced by the inspection target A2 and detects features of the sounds. For this reason, the wireless endpoint 10 collects sounds produced by the inspection target A2, analyzes the collected sounds to obtain the degree of difference from normal sounds as an analysis result, and transmits data including the analysis result to the wireless base station 30. Herein, amplitude is a displacement with reference to a silent state. The data including the analysis result is a packet D1 whose detailed configuration is illustrated in FIG. 2 described later. In the following description, the data including the analysis result is called the packet D1.

The wireless endpoint 10 is provided with a sound collection unit 11, an analysis unit 12, a wireless communication unit 13, and a power supply unit 14. Each unit provided in the wireless endpoint 10 is stored inside a waterproof and dust-proof housing. Herein, the wireless endpoint 10 is described as a device with integrated sensor functions and wireless communication functions. However, a device in which a sensor function unit (sound collection unit 11 and analysis unit 12) and a wireless communication function unit (wireless communication unit 13) configured separately are connected via a signal line may also be treated as the wireless endpoint 10.

The sound collection unit 11 includes a built-in analog-to-digital (AD) conversion unit not illustrated. Additionally, the AD conversion unit of the sound collection unit 11 performs sampling and quantization on a predetermined period with respect to the amplitude of an analog signal of the sounds collected from the inspection target A2, and converts the analog signal into digital values which are output to the analysis unit 12.

The analysis unit 12 analyzes the digital values of the sounds input from the sound collection unit 11, and obtains the degree of difference between the sounds collected by the sound collection unit 11 and normal sounds learned in advance as an analysis result. Subsequently, the analysis unit 12 sends the analysis result to the wireless communication unit 13. The analysis unit 12 is provided with a learning result 15, a feature extraction unit 16, and an abnormality calculation unit 17.

The learning result 15 is data of normal sounds learned in advance by a learning result setting terminal 7, and is learned information about the sounds of the inspection target A2 during normal operation. The learning result 15 is information such as features obtained by calculating the strength of each frequency in an electrical signal converted from normal sounds by the sound collection unit 11, and computing the autocorrelation at predetermined time intervals on the basis of recorded sound information recorded in advance by the learning result setting terminal 7 illustrated in FIG. 8 described later. For example, the learning result 15 is preregistered in the wireless endpoint 10 by the learning result setting terminal 7 when the wireless endpoint 10 is installed.

The feature extraction unit 16 extracts features of an electrical signal on the basis of an electrical signal input from the sound collection unit 11. In other words, the feature extraction unit 16 is capable of extracting features of the sounds produced by the inspection target A2 from the sounds collected by the sound collection unit 11. The features of sounds included in the learning result 15 or extracted by the feature extraction unit 16 refer to parameters that characterize the sounds produced by each inspection target A2. For example, the highness and lowness of frequencies of sounds included in an audible range over a predetermined period are an example of features.

The abnormality calculation unit 17 calculates the degree of difference between the features extracted by the feature extraction unit 16 from the sounds collected by the sound collection unit 11 and the learning result 15 of the normal sounds. An example of a method for calculating the degree of difference will be described. First, the abnormality calculation unit 17 randomly and plurally samples each of the features of the sounds expressed by the learning result 15 and the features of the sounds collected by the sound collection unit 11. Next, the abnormality calculation unit 17 inputs pairs of the sampled features into respectively separate Gaussian mixture models or the like to calculate a score for each pair. Subsequently, by computing the difference between the calculated scores, the abnormality calculation unit 17 obtains the degree of difference between the features extracted by the feature extraction unit 16 and the learning result 15 of the normal sounds. By repeating these processes over a plurality of iterations, the abnormality calculation unit 17 can calculate statistical information such as an average of abnormality and a standard deviation of abnormality illustrated in FIG. 7 described later.

The wireless communication unit 13 wirelessly transmits the packet D1 at a predetermined timing to the wireless base station 30 via the wireless relay 20, the packet D1 being address information about the wireless base station 30 attached to the analysis result obtained by the analysis unit 12. This process is performed by the wireless communication unit 13 communicating with a wireless communication unit 21 of the wireless relay 20. The packet D1 including the analysis result is transmitted to the wireless relay 20, and then transmitted from the wireless relay 20 to the wireless base station 30, as indicated by the wireless communication channel L1.

The power supply unit 14 supplies power stored in a built-in battery 58 (see FIG. 3 described later) built into the wireless endpoint 10, causing the sound collection unit 11, the analysis unit 12, and the wireless communication unit 13 to operate. The built-in battery 58 may be of any type.

The wireless relay 20 forms part of a sensor network set up around the plant, and as described earlier, is capable of forwarding the packets D1 transmitted from the wireless endpoints 10 and 10' to the wireless base station 30.

A sound sensor network capable of detecting unusual sounds produced by the inspection targets A2 and B3 to diagnose the status of the inspection targets A2 and B3 may be included as a part of the sensor network. In this case, the sensor network may include not only the sound sensor network but also a sensor network capable of detecting at least one or more types of information, such as temperature, humidity, pressure, voltage, current, frequency, resistance, flow volume, flow rate, color, and images. Alternatively, all of the sensor networks provided inside the plant may be sound sensor networks.

After receiving the packet(s) D1 wirelessly transmitted from a single wireless endpoint 10 or from a plurality of wireless endpoints 10 and 10', the wireless relay 20 is capable of wirelessly transmitting the packet(s) D1 to the wireless base station 30. The wireless relay 20 is also capable of forwarding each packet D1 received from the plurality of wireless endpoints 10 and 10' to the wireless base station 30. Specifically, the wireless relay 20 can wirelessly communicate with the plurality of wireless endpoints 10 and 10', and transmit the packets D1 received from each of the wireless endpoints 10 and 10' to the wireless base station 30. At this point, the wireless base station 30 instructs the plurality of wireless endpoints 10 and 10' about the transmission order of the packets D1, and wirelessly receives, via the wireless relay 20, the data that the wireless relay 20 received from the wireless endpoints 10 and 10' in accordance with the transmission order.

Figure 11:
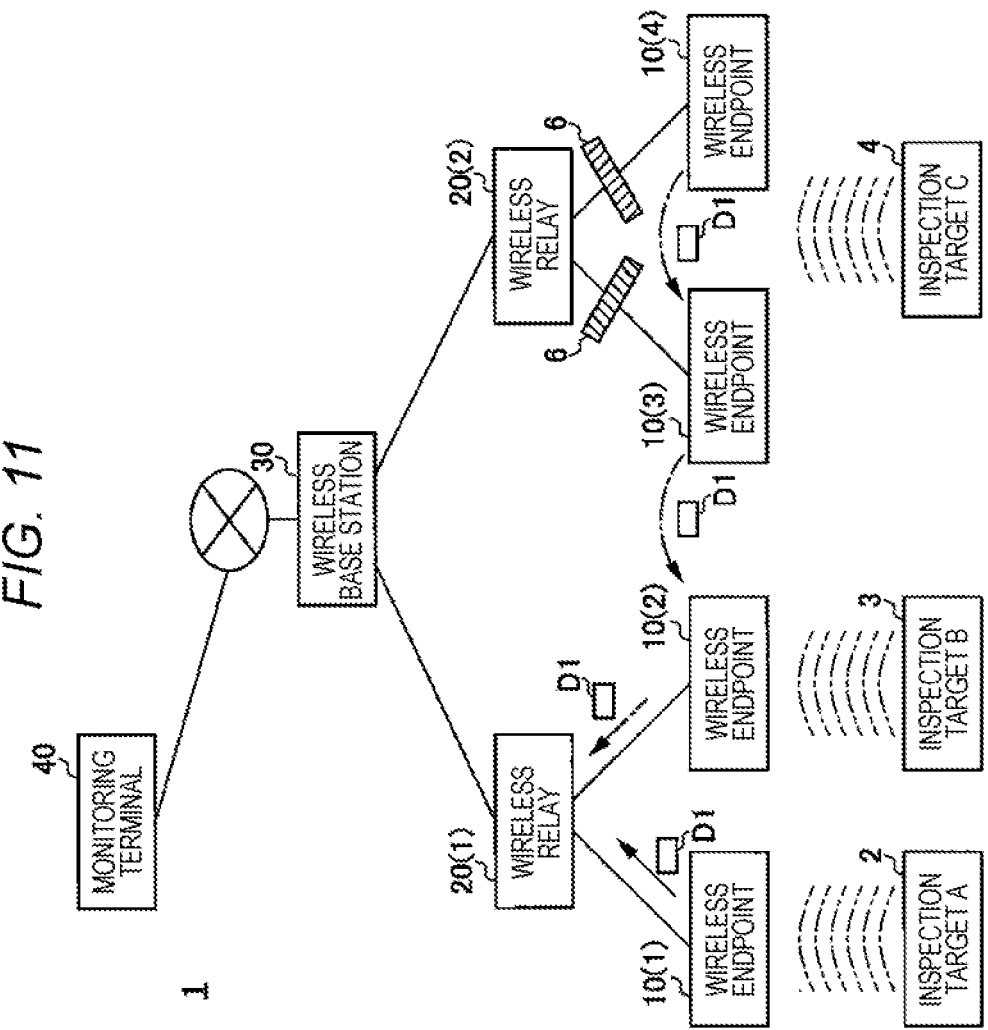
FIG. 11 is a diagram illustrating a first exemplary configuration (single-manager) of a multi-hop network of the automatic inspection system according to the first embodiment of the present invention.
Figure 12:
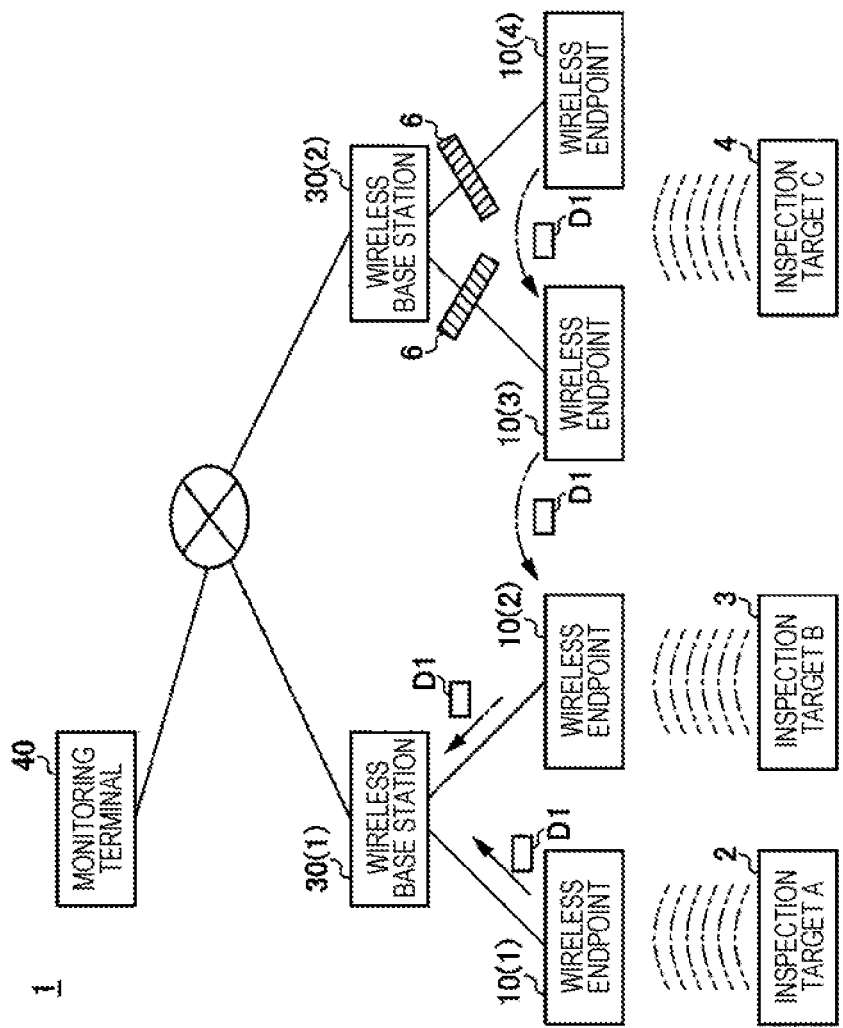
FIG. 12 is a diagram illustrating a second exemplary configuration (multi-manager) of a multi-hop network of the automatic inspection system according to the first embodiment of the present invention.

For example, the wireless base station 30 instructs the plurality of wireless endpoints 10 and 10' selected sequentially according to a polling method to transmit the packets D1 via the wireless relay 20. The wireless endpoints 10 and 10' receiving the instruction from the wireless base station 30 transmit the packets D1 to the wireless relay 20 in sequence. After that, the wireless relay 20 sequentially transmits the packets D1 received from each of the wireless endpoints 10 and 10' to the wireless base station 30 according to the designated transmission order. For this reason, the wireless base station 30 can receive the packets D1 while avoiding collisions between the packets D1 transmitted from the plurality of wireless endpoints 10 and 10' via the wireless relay 20. Note that, as illustrated in FIGS. 11 and 12 described later, a plurality of wireless endpoints 10 and 10' in proximity with each other can also use what is referred to as a bucket relay method (multi-hop routing) so that the wireless endpoints 10 and 10' can forward the packets D1 to the wireless relay 20. At this time, the wireless endpoint 10(3) (see FIGS. 11 to 13) that performs a bucket relay of the packets D1 functions as a wireless relay that relays the packets D1.

Note that although FIG. 1 illustrates an example in which only one wireless relay 20 is provided, a plurality of wireless relays 20 may also be provided. Also, the wireless communication channel L1 does not have to include the wireless relay 20. In this case, the wireless endpoint 10 can also execute direct wireless communication with the wireless base station 30.

The wireless base station 30 manages the data (packets D1) received from the wireless endpoint 10 via the wireless relay 20. For this reason, the wireless base station 30 has a function of interpreting the content of the packets D1 (referred to as a data parsing function, for example) and saving the content as a file, for example. The content of the data written to the file may be the analysis result transmitted from the wireless endpoint 10 converted to text, or may be the bit or byte information of the packets expressed directly as text. The format of the file is conceivably any of various formats, such as tab-delimited, space-delimited, and comma-delimited. This wireless base station 30 transmits the analysis result retrieved from the data to the monitoring terminal 40 in response to a request from the monitoring terminal 40 that monitors a status of the inspection targets A2 and B3. Consequently, the wireless base station 30 stores the analysis result received from the wireless endpoint 10. Additionally, the wireless base station 30 detects a status change of the inspection targets A2 and B3 that have deteriorated over time for example, on the basis of features of the sounds collected by the sound collection unit 11 expressed as an average of abnormality or a standard deviation of abnormality of the inspection targets A2 and B3 and the degree of difference from the learning result 15 of the normal sounds which are computed from the analysis result. Thereafter, the wireless base station 30 notifies the monitoring terminal 40 of the possibility of abnormality in the inspection targets A2 and B3 on the basis of the detected status change of the inspection targets A2 and B3. The wireless base station 30 is provided with a wireless communication unit 31, a data storage unit 32, and a data disclosure unit 33.

The wireless communication unit 31 communicates with the wireless relay 20.

The data storage unit 32 retrieves data including the analysis result from the packet D1 received from the wireless endpoint 10, and stores the data in association with the time when the wireless base station 30 collected the packet D1. With this arrangement, the data storage unit 32 converts the data into time-series data. In the case where the data storage unit 32 is not equipped with enough storage capacity to hold all of the time-series data, data to be saved may be transferred to an external information processing device or information storage device to store all of the information for the system as a whole.

The data disclosure unit 33 provides the time-series data held in the data storage unit 32 and the probability of an abnormality in the inspection targets A2 and B3 to the monitoring terminal 40 in response to a request from the monitoring terminal 40.

The monitoring terminal 40 is used by a worker to monitor the status of the inspection targets A2 and B3 through the wireless base station 30. This monitoring terminal 40 performs a process of determining and disclosing the status of the inspection targets A2 and B3 from the analysis result received from the wireless base station 30. For example, the monitoring terminal 40 outputs information such as a graph presentation of the time-series data as a monitoring result to a device such as a display or a printer. The monitoring terminal 40 is also capable of performing data analysis processing such as clustering of the time-series data held in the data storage unit 32.

FIG. 2 is a diagram illustrating an exemplary configuration of a packet D1 including an analysis result.

The packet D1 contains a header and a data part. In the data part, data expressing an average value of abnormality and a standard deviation value of abnormality is stored as the analysis result.

The header includes destination information expressed as a network address (for example, an IP address), identification information of the wireless base station 30, or the like specifying the wireless base station 30 where the packet D1 is to ultimately arrive.

The average of the abnormality is a value obtained by averaging, over a unit time, the abnormality calculated by the abnormality calculation unit 17 at predetermined timings.

The standard deviation of the abnormality is the value of the standard deviation calculated by the abnormality calculation unit 17 on the basis of the average of the abnormality.

Next, an exemplary hardware configuration of computers 50 and 60 included in each device of the automatic inspection system 1 will be described with reference to FIGS. 3 and 4.

Figure 3:
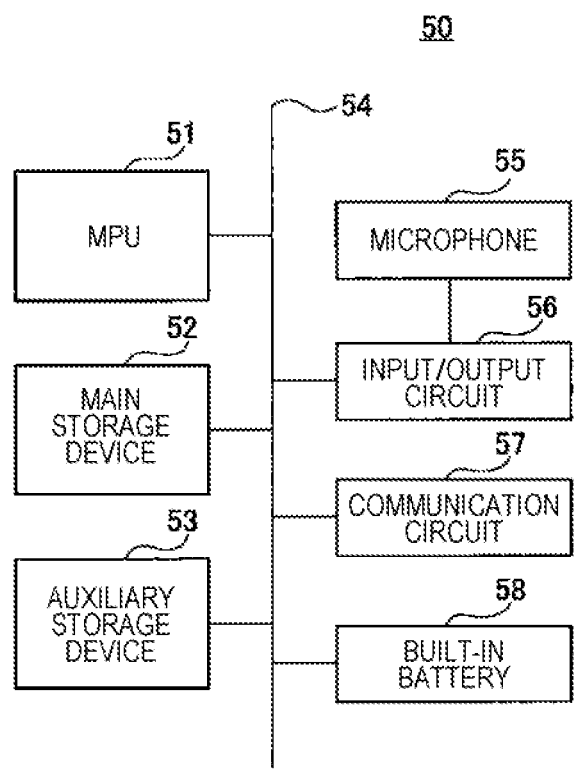
FIG. 3 is a block diagram illustrating an exemplary hardware configuration of a computer included in a wireless endpoint according to the first embodiment of the present invention.

FIG. 3 is a block diagram illustrating an exemplary hardware configuration of a computer 50 included in a wireless endpoint 10. Note that because the exemplary hardware configuration of the computer 50 included in the wireless endpoint 10' is similar to that of the wireless endpoint 10, the following description will focus on the wireless endpoint 10 to describe the exemplary hardware configuration of the computer 50 included in the wireless endpoint 10.

The computer 50 is hardware used as a computing device used in the wireless endpoint 10. The computer 50 is provided with a micro-processing unit (MPU) 51, a main storage device 52, an auxiliary storage device 53, and a bus 54. Additionally, the computer 50 is provided with a microphone 55, an input/output circuit 56, a communication circuit 57, and a built-in battery 58. These blocks are communicably interconnected through the bus 54.

The MPU 51 reads out the program code of software implementing each function of the wireless endpoint 10 according to the present embodiment from the auxiliary storage device 53, loads the program code into the main storage device 52, and executes the program code. Consequently, a program for causing the computer 50 to function is recorded along with a boot program and various parameters in the auxiliary storage device 53. The auxiliary storage device 53 permanently stores information such as programs and data necessary for the MPU 51 to operate, and is used as an example of a non-transitory computer-readable recording medium storing a program executed by the computer 50. Non-volatile memory such as semiconductor memory is used as the auxiliary storage device 53.

Information such as variables and parameters produced during arithmetic processing by the MPU 51 is temporarily written to the main storage device 52, and this information such as variables and parameters is read out by the MPU 51 as appropriate. In the wireless endpoint 10, the function of each component in the wireless endpoint 10 is achieved by having the MPU 51 execute a program. Also, in the wireless endpoint 10, digital values received from the sound collection unit 11 (microphone 55) are temporarily stored in the auxiliary storage device 53, and the analysis result from the analysis unit 12 is also temporarily stored in the auxiliary storage device 53.

The microphone 55 is a device that collects sounds produced by the inspection target A2, and outputs digital values of the sounds. Here, sounds in an ultrasonic range above the auditory range are known to be produced when an abnormality begins to occur in the inspection target A2. Consequently, the microphone 55 may have a function of collecting not only audible sounds, but also sounds outside the auditory range, such as ultrasonic waves produced by the inspection target A2, for example. By collecting and analyzing ultrasonic waves produced by the inspection target A2, the wireless endpoint 10 detects an abnormality of the inspection target A2 more accurately and quickly.

The input/output circuit 56 is an interface for inputting and outputting digital signals. The input/output circuit 56 has a function of outputting a digital signal input from the microphone 55 into the feature extraction unit 16 of the analysis unit 12.

For the communication circuit 57, a device such as network interface card (NIC) or a low-power wireless module designed for the Internet of Things (IoT) is used, for example. The communication circuit 57 is capable of transmitting and receiving various data with other devices over a wireless communication channel such as a wireless local area network (LAN) connected to the NIC or a multi-hop low-power wireless network. In the wireless endpoint 10, the wireless communication unit 13 can control the operation of the communication circuit 57 to transmit a packet D1 to the wireless relay 20 or forward a packet D1 received from another wireless endpoint 10 to the wireless relay 20.

The built-in battery 58 is built into the wireless endpoint 10, and supplies power to each unit of the computer 50 under control by the power supply unit 14 illustrated in FIG. 1. The built-in battery 58 according to the present embodiment is assumed to be a primary battery, but in the second embodiment described later, the built-in battery 58 may also be a secondary battery.

Figure 4:
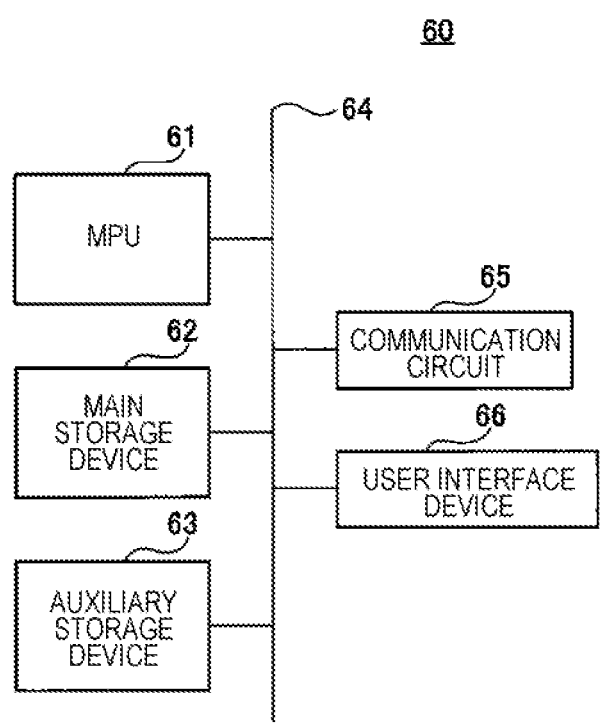
FIG. 4 is a block diagram illustrating an exemplary hardware configuration of a computer included in a wireless relay, a wireless base station, and a monitoring terminal according to the first embodiment of the present invention.

FIG. 4 is a block diagram illustrating an exemplary hardware configuration of a computer 60 included in a wireless relay 20, a wireless base station 30, and a monitoring terminal 40.

The computer 60 is hardware used as a computing device used in the wireless relay 20, the wireless base station 30, and the monitoring terminal 40. The computer 60 is provided with an MPU 61, a main storage device 62, an auxiliary storage device 63, a bus 64, a communication circuit 65, and a user interface device 66. These blocks are communicably interconnected through the bus 64.

The MPU 61 reads out the program code of software implementing each function of the wireless relay 20, the wireless base station 30, and the monitoring terminal 40 according to the present embodiment from the auxiliary storage device 63, loads the program code into the main storage device 62, and executes the program code.

Information such as variables and parameters produced during arithmetic processing by the MPU 61 is temporarily written to the main storage device 62, and this information such as variables and parameters is read out by the MPU 61 as appropriate. In the wireless relay 20, the function of controlling the wireless communication unit 21 to forward the packet D1 received from the wireless endpoint 10 to the wireless base station 30 is achieved by the MPU 61. In the wireless base station 30, the wireless communication unit 31 controls the operation of the communication circuit 65 to acquire the packet D1 forwarded from the wireless relay 20, and the MPU 61 stores various data retrieved from the data part of the packet D1 in the data storage unit 32. Also, in the wireless base station 30, the function of the data disclosure unit 33 disclosing data retrieved from the data storage unit 32 to the monitoring terminal 40 is achieved by the MPU 61. In the monitoring terminal 40, the function of receiving data that has been subjected to a disclosure process by the data disclosure unit 33, and presenting the data to the worker through the user interface device 66 is achieved by the MPU 61.

For the auxiliary storage device 63, a device such as a hard disk drive (HDD), a solid-state drive (SSD), a flexible disk, an optical disc, a magneto-optical disc, CD-ROM, CD-R, magnetic tape, or non-volatile memory is used, for example. A program for causing the computer 60 to function is recorded along with an OS and various parameters in the auxiliary storage device 63. The auxiliary storage device 63 permanently stores information such as programs and data necessary for the MPU 61 to operate, and is used as an example of a non-transitory computer-readable recording medium storing a program executed by the computer 60. In the wireless base station 30, the function of the data storage unit 32 is achieved by the auxiliary storage device 63. Also, in the monitoring terminal 40, the function of accumulating analysis results transmitted from the wireless base station 30 is achieved by the auxiliary storage device 63.

For the communication circuit 65 in the monitoring terminal 40, a device such as a NIC is used for example, making it possible to transmit and receive various data with other devices over a wireless communication channel such as a wireless LAN or a wired communication channel connected to the NIC. In the wireless relay 20 and the wireless base station 30, a device such as a low-power wireless module designed for IoT is used as the communication circuit 65. In the wireless relay 20, the wireless communication unit 21 controls the operation of the communication circuit 65 to forward the packet D1 received from the wireless endpoint 10 to the wireless base station 30. In the wireless base station 30, the wireless communication unit 31 controls the operation of the communication circuit 65 to receive the packet D1 transmitted from the wireless relay 20. The wireless base station 30 can also transmit data to the monitoring terminal 40 through the communication circuit 65. In the monitoring terminal 40, the wireless communication unit not shown controls the operation of the communication circuit 65 to receive the data transmitted from the wireless base station 30.

For the user interface device 66, a device such as a liquid crystal display monitor, a touch panel device, a mouse, or a keyboard is used, for example. The worker is able to check the data displayed on the user interface device 66 and input various commands through the user interface device 66. The user interface device 66 is mainly provided in the monitoring terminal 40. The user interface device 66 does not have to be provided in the wireless relay 20 and the wireless base station 30.

Note that in the case where no power is supplied to the wireless relay 20 from an external power source, the wireless relay 20 may also be equipped with a built-in battery.

Next, an example of processes executed by the wireless endpoint 10, the wireless relay 20, and the wireless base station 30 will be described in order with reference to FIGS. 5 and 6. Regarding processes executed by the wireless endpoint 10' which are similar to the processes executed by the wireless endpoint 10, a detail description is omitted.

Figure 5:
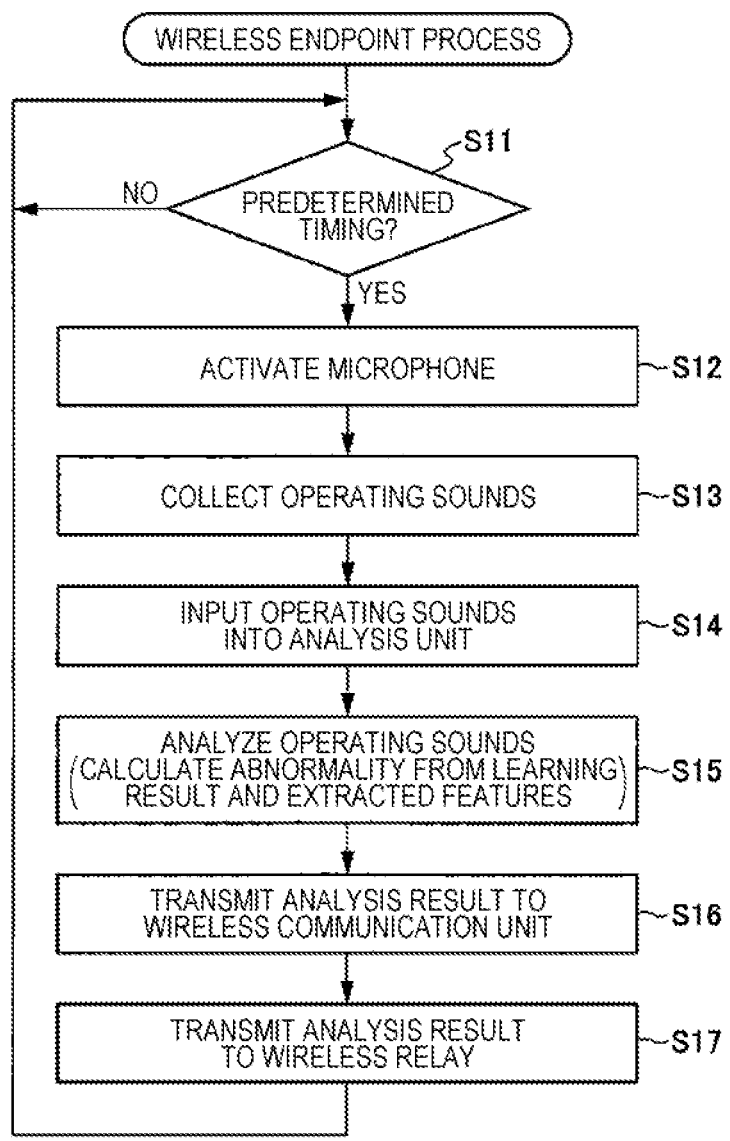
FIG. 5 is a flowchart illustrating an example of a process executed by the wireless endpoint according to the first embodiment of the present invention.

FIG. 5 is a flowchart illustrating an example of a process executed by the wireless endpoint 10.

The wireless endpoint 10 monitors whether a predetermined timing has arrived (S1). If the predetermined timing has not arrived (S11: No), the wireless endpoint 10 continues monitoring for the arrival of the timing.

If the predetermined timing arrives (S11: Yes), the wireless endpoint 10 supplies power from the power supply unit 14 to the sound collection unit 11 and activates the microphone 55 (S12). The predetermined timing may occur on a regular cycle, or may be irregular. Furthermore, the wireless endpoint 10 may also set the predetermined timing in accordance with an instruction from the wireless base station 30 issued to the wireless endpoint 10 through the wireless relay 20.

The sound collection unit 11 collects the operating sounds of the inspection target A2 (S13). The operating sounds collected by the sound collection unit 11 are input into the analysis unit 12 (S14).

The analysis unit 12 analyzes the operating sounds input from the sound collection unit 11, and detects the degree of difference from normal sounds on the basis of the learning result 15 of the normal sounds learned in advance and features extracted from the sounds (S15). Subsequently, the analysis unit 12 sends the analysis result to the wireless communication unit 13 (S16).

The wireless communication unit 13 generates the packet D1 on the basis of the analysis result received from the analysis unit 12, and transmits the packet D1 to the wireless relay 20 (S17).

Figure 6:
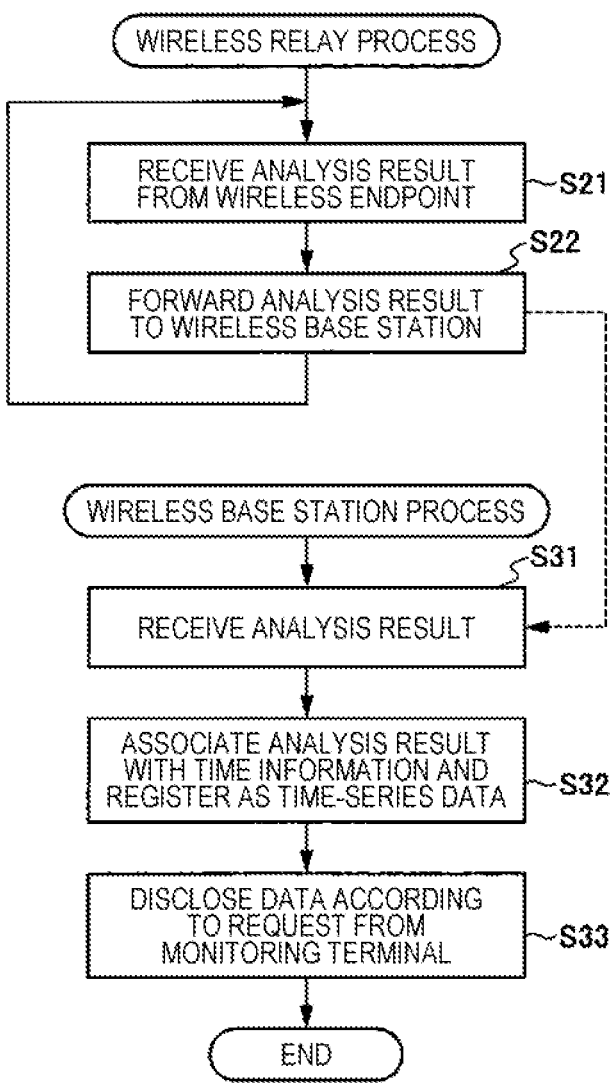
FIG. 6 is a flowchart illustrating an example of a process executed by the wireless relay and an example of a process executed by the wireless base station according to the first embodiment of the present invention.

FIG. 6 is a flowchart illustrating an example of a process executed by the wireless relay 20 and an example of a process executed by the wireless base station 30.

First, the processes by the wireless relay 20 will be described.

When the wireless relay 20 receives the packet D1 including the analysis result from the wireless endpoint 10 (S21), the wireless relay 20 forwards the packet D1 including the analysis result to the wireless base station 30 (S22). The packet D1 transmitted from the wireless endpoint 10 arrives at the wireless base station 30 according to the network address or identification information included in the header, even in cases where the packet D1 goes through other devices in transit.

When the wireless base station 30 receives the packet D1 including the analysis result from the wireless endpoint 10 through the wireless relay 20 (S31), the wireless base station 30 retrieves the analysis result from the packet D1, and converts the analysis result into data (S32). Conversion into data refers to storing time information about the time when the packet D1 was collected in association with the analysis result, and thereby registering the analysis result in the data storage unit 32 as time-series data.

After that, the wireless base station 30 transmits the time-series data (one example of the analysis result) in response to a request from the monitoring terminal 40, and the monitoring terminal 40 determines and discloses the status of the inspection target A2 from the analysis result (S33). On the monitoring terminal 40, the time-series data disclosed upon request is displayed in a predetermined user interface by the user interface device 66.

Figure 7:
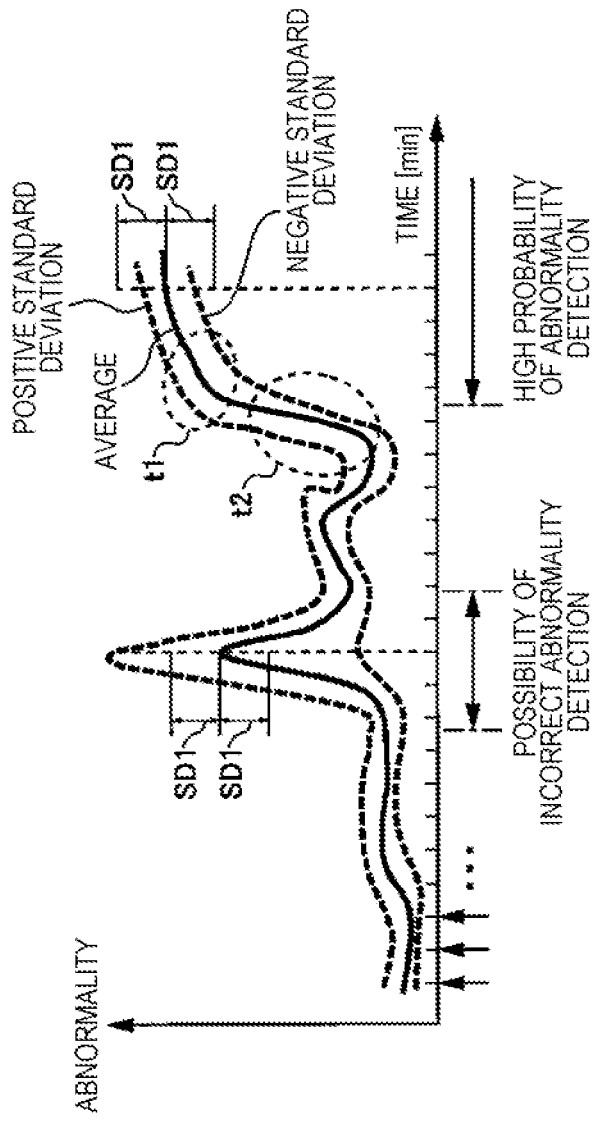
FIG. 7 is a graph illustrating change over time in abnormality according to the first embodiment of the present invention.

FIG. 7 is a graph illustrating change over time in abnormality. In FIG. 7, the vertical axis represents abnormality, and the horizontal axis represents time. Also, the vertical lines plotted on the horizontal axis indicate the timings at which the wireless endpoint 10 transmits the average of abnormality and the standard deviation of abnormality as the analysis result.

In FIG. 7, the average of abnormality and the standard deviation of abnormality calculated by the abnormality calculation unit 17 are graphed together. The abnormality calculation unit 17 can calculate an average of abnormality of the inspection target A2, and a positive and negative standard deviations with respect to the average of abnormality. In FIG. 7, the dashed line above the average of abnormality represents the positive standard deviation, while the dashed line below the average of abnormality represents the negative standard deviation.

The probability of an abnormality occurring in the inspection target A2 is expressed by the average of abnormality and the standard deviation of abnormality both rising over a predetermined period or longer. Additionally, the abnormality calculation unit 17 can detect an abnormality in the inspection target A2 in the case where the abnormality rises above a predetermined threshold. In the case where the abnormality calculation unit 17 detects an abnormality in the inspection target A2, or in other words, in the case where the average of abnormality and the standard deviation of abnormality computed by the data disclosure unit 33 from the analysis result both rise over a predetermined period or longer, the wireless base station 30 can activate an alarm or the like to notify the monitoring terminal 40 that an abnormality has occurred in the inspection target A2.

However, even if the average of abnormality is high, in the case where the magnitude of the standard deviation of abnormality is a predetermined value or greater, there is a high probability that the abnormality calculation unit 17 has incorrectly detected an abnormality in the inspection target A2. On the other hand, if the average of abnormality rises and the magnitude of the standard deviation of abnormality continues to be less than a predetermined value over a predetermined period or longer, there is a high probability that the abnormality calculation unit 17 has correctly detected an abnormality in the inspection target A2.

Accordingly, in the case where the average and standard deviation of abnormality are a predetermined value SD1 or greater, the data disclosure unit 33 of the wireless base station 30 determines that the abnormality calculation unit 17 has incorrectly detected an abnormality in the inspection target. Conversely, in the case where the average and standard deviation of abnormality are less than the predetermined value SD1, the data disclosure unit 33 determines that the abnormality calculation unit 17 has correctly detected an abnormality in the inspection target. Subsequently, the data disclosure unit 33 notifies the monitoring terminal 40 of information about the inspection target A2 with a high probability of an abnormality occurring. When the worker who operates the monitoring terminal 40 checks the notification, the worker can perform an early inspection of the inspection target A2 and take appropriate action such as repairing or replacing the inspection target A2 as necessary.

Note that in the case where there is a high probability that the abnormality calculation unit 17 has incorrectly detected an abnormality, the wireless base station 30 does not activate an alarm in the monitoring terminal 40. On the other hand, in the case where there is a high probability that the abnormality calculation unit 17 has correctly detected an abnormality, the wireless base station 30 activates an alarm in the monitoring terminal 40, drawing the worker's attention. Because the wireless base station 30 is capable of using the average of abnormality and the standard deviation of abnormality to judge the validity of the abnormality in this way, the alarm is not activated frequently even if the abnormality increases momentarily. Note that the predetermined value SD1 may be modified appropriately according to the type of the inspection target A2 and the aging of the inspection target A2. The predetermined value SD1 may also be set to different values with respect to the positive and negative standard deviations.

In the abnormality detection method of the related art, the worker listens to the sounds of the inspection target A2 using his or her own ears to determine the presence or absence of abnormality, and for this reason, the worker is unable to detect an abnormality unless the sounds of the inspection target A2 become sufficiently loud, as indicated at a time t1. On the other hand, in the abnormality detection method according to the present embodiment, the worker is notified of the detection of an abnormality at a time t2 earlier than the time t1, on the basis of the average of abnormality and the standard deviation of abnormality both rising. For this reason, by using the abnormality detection method according to the present embodiment, the worker is able to deal with an abnormality of the inspection target A2 at an earlier timing than the abnormality detection method of the related art.

Meanwhile, because the process of learning the normal sounds is highly intensive, it is infeasible to perform the learning process in the wireless endpoint 10 having limited usable power and storage space. Accordingly, when installing the wireless endpoint 10, the worker prepares the learning result setting terminal 7 and performs an operation of setting the learning result 15 in the wireless endpoint 10. Accordingly, an example of the configuration and processes of the learning result setting terminal 7 that sets the learning result 15 will be described with reference to FIGS. 8 and 9.

Figure 8:
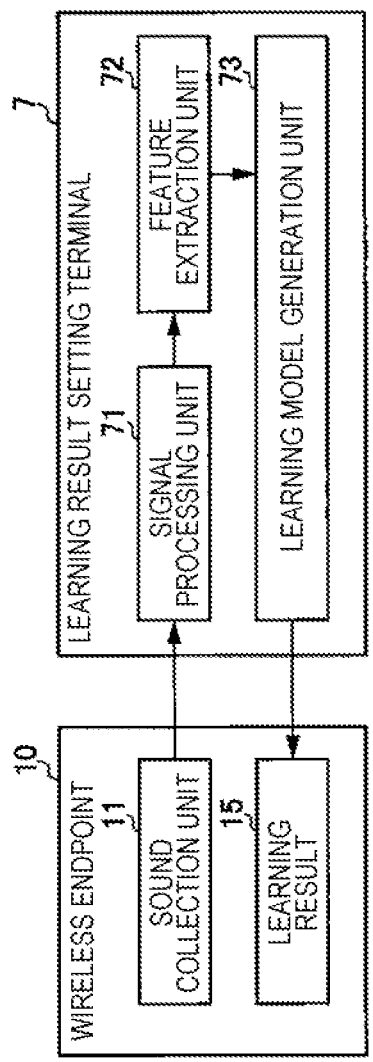
FIG. 8 is a block diagram illustrating an exemplary internal configuration of a learning result setting terminal connected to the wireless endpoint according to the first embodiment of the present invention.

FIG. 8 is a block diagram illustrating an exemplary internal configuration of a learning result setting terminal 7 connected to the wireless endpoint 10.

Figure 9:
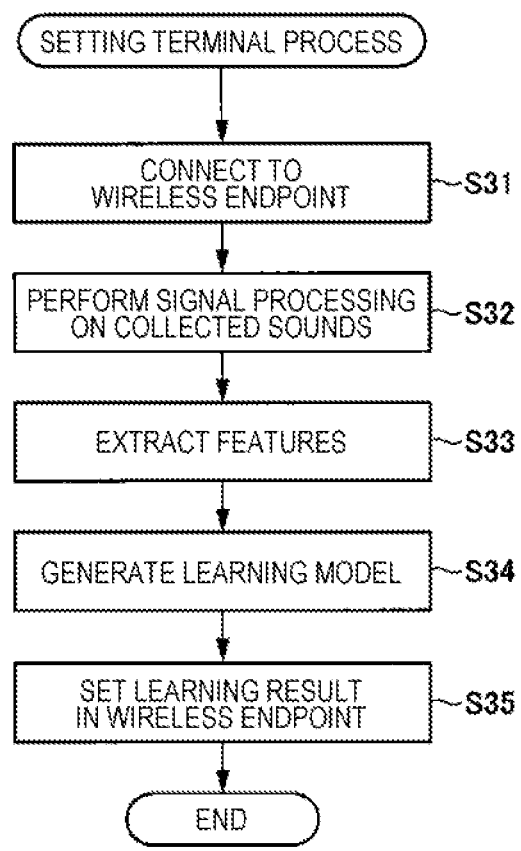
FIG. 9 is a flowchart illustrating an example of a process by the learning result setting terminal according to the first embodiment of the present invention.

FIG. 9 is a flowchart illustrating an example of a process by the learning result setting terminal 7.

For the learning result setting terminal 7, a device such as a notebook or tablet computer that can be carried by the worker is used. It is sufficient to apply the computer 60 illustrated in FIG. 4 to the hardware configuration of the learning result setting terminal 7. The learning result setting terminal 7 is provided with a signal processing unit 71, a feature extraction unit 72, and a learning model generation unit 73.

First, when installing the wireless endpoint 10, the worker connects the learning result setting terminal 7 to the wireless endpoint 10 (S31). Next, the signal processing unit 71 performs various processes such as input processing, noise removal, and amplification processing on the digital signal of the sounds output from the sound collection unit 11 of the wireless endpoint 10 (S32).

Next, the feature extraction unit 72 extracts features of the sounds produced by the inspection target A2 on the basis of the digital signal processed by the signal processing unit 71 (S33). Note that in many cases, the operation of using the learning result setting terminal 7 to set the learning result 15 is performed at a time when the worker knows in advance that the inspection target A2 is operating normally. For this reason, the features of the sounds extracted by the feature extraction unit 72 are treated as the features of normal sounds.

Next, the learning model generation unit 73 generates a learning model, treating the extracted features as input (S34). The learning model generation unit 73 is achieved using artificial intelligence (AI), for example. Herein, if inspection targets A2 of the same model exist, the features of sounds may be similar even if the installation locations are different. Accordingly, the learning model generation unit 73 is capable of raising the accuracy of the learning model by repeatedly performing the process of generating the learning model on the basis of features extracted in relation to sounds produced by many inspection targets A2.

Additionally, the learning model generation unit 73 sets the learning result 15 generated using the learning model in the wireless endpoint 10 (S35). After the setting of the learning result 15 is complete, the process ends. In this way, even if the wireless endpoint 10 itself does not perform a learning process, by using the appropriate learning result 15 set by the learning result setting terminal 7, the wireless endpoint 10 is capable of performing a process that obtains the degree of difference between the sounds collected by the sound collection unit 11 and the normal sounds learned in advance as the analysis result.

Note that although FIGS. 8 and 9 illustrate an example of the learning result setting terminal 7 performing the learning process, the learning process may also be performed by a cloud server accessible by the learning result setting terminal 7 over the Internet, for example. In this case, the learning result setting terminal 7 does not generate the learning model, but instead transmits digital data of the sounds collected by the sound collection unit 11 to the cloud server, and requests the cloud server to perform the learning process. Thereafter, the learning result setting terminal 7 receives the learning result 15 computed by the cloud server from the cloud server, and performs the process of setting the learning result 15 in the wireless endpoint 10.

In the automatic inspection system 1 according to the first embodiment described above, the wireless endpoint 10 is provided with the sound collection unit 11, and at fixed time intervals (for example, every 10 minutes or every hour), the wireless endpoint 10 activates the sound collection unit 11 and causes the sound collection unit 11 to collect the operating sounds of the inspection target A2. In the automatic inspection system 1, sound data of the entire frequency band that can be collected by the sound collection unit 11 is not transmitted from the wireless endpoint 10 to the wireless base station 30, and instead the packet D1 including only a small portion of the data, namely the degree of difference from normal sounds learned in advance as the analysis result, is transmitted to the wireless base station 30. For this reason, the data size of the packet D1 of the analysis result transmitted from the wireless endpoint 10 to the wireless base station 30 can be reduced to less than the data size of the direct data of the sounds collected by the sound collection unit 11.

Also, because the wireless endpoint 10 is driven intermittently to transmit the packet D1 having the minimum size sufficient for the wireless base station 30 to retrieve the analysis result, the power consumption of the wireless endpoint 10 can be reduced. Consequently, the wireless endpoint 10 is capable of reducing the power energy required for a single transmission of the analysis result, and minimizing the consumption of power from the built-in battery 58. As a result, the lifetime of the built-in battery 58 in the wireless endpoint 10 is extended, and the frequency of battery replacement in the wireless endpoint 10 can be reduced.

Also, the wireless endpoint 10 transmits a portion of the information extracted from the sound data acquired from the inspection target A2 over a long period to the wireless base station 30. Additionally, the wireless base station 30 manages features of the sound data acquired by the wireless endpoint 10, and when abnormal sounds are detected, the wireless base station 30 notifies the monitoring terminal 40 of the possibility of an abnormality occurring in the inspection target A2. For this reason, the worker who uses the monitoring terminal 40 is able to remotely monitor the status of the inspection target A2, and the number of times the worker has to approach the inspection target A2 to check for abnormal sounds can be decreased. For this reason, it is not only possible to reduce the operating costs of the inspection target A2, but also improve the utility of the automatic inspection system 1.

Note that if the wireless base station 30 exists within the range of the communicable distance of the wireless endpoint 10, the wireless relay 20 does not have to be provided in the automatic inspection system 1, and the wireless endpoint 10 may be configured to communicate directly with the wireless base station 30.

Also, the sound collection unit 11 may not include the AD conversion unit, and may be configured to output an analog signal of sounds produced by the inspection target A2. In this case, the analysis unit 12 is provided with an AD conversion unit upstream of the feature extraction unit 16. The AD conversion unit of the analysis unit 12 performs sampling and quantization on a predetermined period with respect to the amplitude of an analog signal of the sounds input from the sound collection unit 11, and converts the analog signal into digital values which are output the digital values to the feature extraction unit 16. The processes thereafter are performed in a similar manner as the processes of each unit according to the first embodiment.

[Exemplary Configuration in which Microphone is Separate from Wireless Endpoint]

Figure 10:
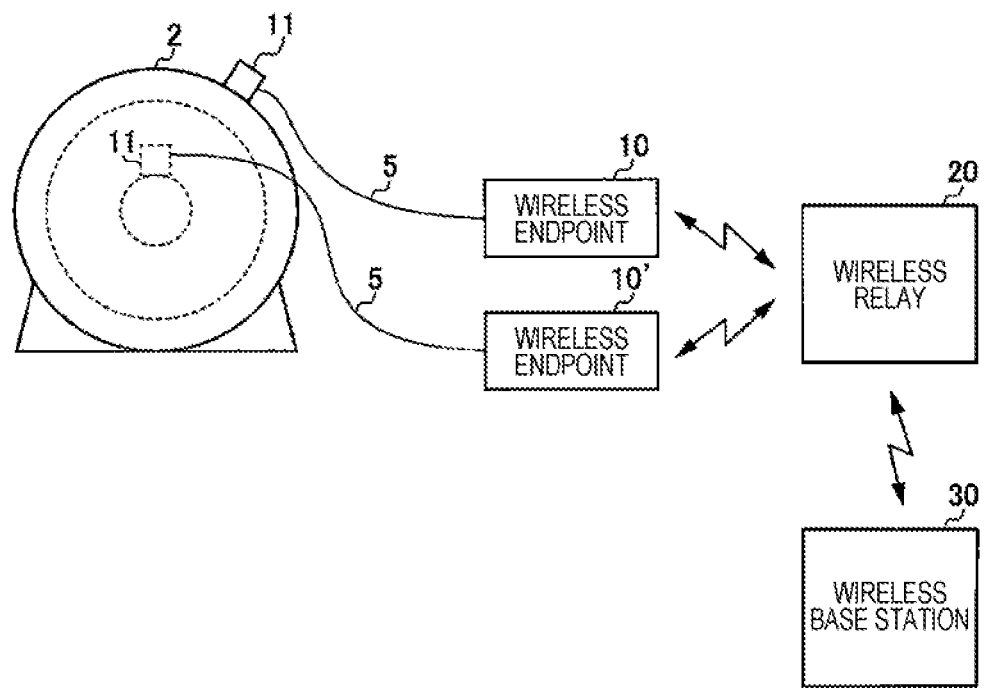
FIG. 10 is a diagram illustrating an example of an installation location of the wireless endpoint according to the first embodiment of the present invention.

FIG. 10 is a diagram illustrating an example of an installation location of the wireless endpoint 10.

In the wireless endpoint 10 illustrated in FIG. 1, the sound collection unit 11 is built-in, and the wireless endpoint 10 is installed at a position distant from the inspection target A2. However, as illustrated in FIG. 10, a configuration is also possible in which the sound collection unit 11 provided in the wireless endpoint 10 can be removed from the housing of the wireless endpoint 10, separated from the wireless endpoint 10, and attached to the inspection target A2.

Because the size of the sound collection unit 11 (microphone 55) is small compared to the housing of the wireless endpoint 10, it is possible to attach the sound collection unit 11 directly to the inspection target A2. For example, in the case where the inspection target A2 is a motor, it is possible to attach the sound collection unit 11 directly to the bearing of the motor or to the outside of the motor cover. By attaching the sound collection unit 11 directly to each part of the motor in this way, the sounds collected by the sound collection unit 11 are less susceptible to the influence of environmental sounds in the surrounding area where the motor is installed.

The sound collection unit 11 and the wireless endpoint 10 are connected by a power line and a signal line drawn out from the wireless endpoint 10. The power line and the signal line are sheathed in a cable 5 that connects the sound collection unit 11 and the wireless endpoint 10. The sound collection unit 11 operates under power supplied from the power supply unit 14 (built-in battery 58) through the power line. Also, the sound collection unit 11 outputs a digital signal of sounds collected from the inspection target A2 to the analysis unit 12 of the wireless endpoint 10 through the signal line. The analysis unit 12 is capable of analyzing sounds on the basis of a digital signal of the sounds produced by the inspection target A2 alone, without including ambient noise.

[First Exemplary Configuration (Single-Manager) of a Multi-Hop Network]

FIG. 11 is a diagram illustrating a first exemplary configuration (single-manager) of a multi-hop network of the automatic inspection system 1 according to the first embodiment.

As illustrated in FIG. 1, the automatic inspection system 1 is provided with wireless endpoints 10 and 10', a wireless relay 20. Normally, the wireless relay 20 set as the destination to which the wireless endpoints 10 and 10' initially transmit the packet D1 is predetermined. However, in many cases, the environment in which the wireless endpoints 10 and 10' are installed is inside a plant where equipment of various shapes are disposed. For this reason, if a piece of equipment 6 is newly installed after the wireless endpoints 10 and 10' are installed, the wireless endpoints 10 and 10' may have difficulty transmitting the packet D1 to the wireless relay 20.

Here, a multi-hop network according to a first exemplary configuration of the automatic inspection system 1 will be described. In a multi-hop network, the plurality of wireless endpoints 10 and 10' are capable of forwarding the packet D1. To identify each of the plurality of wireless endpoints 10 and 10', an example of a multi-hop network provided with wireless endpoints 10(1) to 10(4) labeled by the signs (1) to (4) is illustrated. Further, to identify the plurality of the wireless relays 20, an example of a multi-hop network provided with wireless relays 20(1) and 20(2) labeled by the signs (1) and (2) is illustrated.

The wireless endpoint 10(1) collects sounds produced by the inspection target A2, and the wireless endpoint 10(2) collects sounds produced by the inspection target B3. Additionally, the wireless endpoints 10(3) and 10(4) respectively collect sounds produced from different locations of an inspection target C4. For example, packets D1 from the two wireless endpoints 10(1) and 10(2) are transmitted to the wireless relay 20(1) illustrated on the left side of FIG. 11. Also, packets D1 from the two wireless endpoints 10(3) and 10(4) are transmitted to the wireless relay 20(2) illustrated on the right side of FIG. 11.

However, suppose that pieces of equipment 6 are installed between the wireless relay 20(2) and each of the two wireless endpoints 10(3) and 10(4) illustrated on the right side of FIG. 11, disrupting direct communication between the wireless relay 20(2) and the two wireless endpoints 10(3) and 10(4). In this way, among the plurality of wireless endpoints 10(1) to 10(4), in a case of detecting that the wireless endpoints 10(3) and 10(4) cannot transmit the packets D1 to the wireless relay 20(2), the wireless endpoints 10(3) and 10(4) request the other wireless endpoint 10(2), which is capable of transmitting data to the other wireless relay 20(1), to forward the packets D1.

Accordingly, the wireless endpoints 10(3) and 10(4) which cannot transmit the packets D1 to the other wireless relay 20(2) search for the wireless endpoints 10(1) and 10(2) capable of transmitting the packets D1 to the wireless relay 20(1). In addition, the wireless endpoints 10(3) and 10(4) which are unable to transmit the packets D1 forward the packets D1 to the wireless endpoint 10(2) which can transmit the packets D1. At this time, the wireless endpoint 10(3) transmits its own packet D1 to the wireless endpoint 10(2) and also forwards the packet D1 transmitted from the wireless endpoint 10(4) to the wireless endpoint 10(2).

Further, the other wireless endpoint 10(2) forwards the packet D1 transmitted from the wireless endpoints 10(3) and 10(4) to the wireless relay 20(1). In other words, the wireless endpoint 10(2) transmits its own packet D1 to the wireless relay 20(1), and in addition, also transmits the packets D1 transmitted or forwarded from the wireless endpoint 10(3) to the wireless relay 20(1). By having the automatic inspection system 1 form a multi-hop network in this way, all of the wireless endpoints 10(1) to 10(4) can transmit the packets D1 to the wireless base station 30 via the wireless relay 20(1).

Note that if the wireless endpoints 10(2) and 10(3) continue to forward the packets D1 over a long period, the consumption of power from the built-in battery 58 in the wireless endpoints 10(2) and 10(3) will become higher than the power consumption in the other wireless endpoints 10(1) and 10(4). For this reason, the monitoring terminal 40 may also be notified through the wireless base station 30 of the existence of the wireless endpoint 10(2) that has begun forwarding the packets D1 transmitted from the other wireless endpoints 10(3) and 10(4). Through this notification, the worker is able to learn of the situation in which wireless communication is unavailable between the wireless endpoints 10(3) and 10(4) and the wireless relay 20(2). Thereafter, the worker can take appropriate measures such as moving the wireless endpoints 10(3) and 10(4) to positions that allow communication with the wireless relay 20(2), or moving the equipment 6.

Through the external Internet, the monitoring terminal 40 is capable of monitoring the status of the inspection target A2 at a place distant from the plane where the inspection target A2 is installed.

[Second Exemplary Configuration (Multi-Manager) of a Multi-Hop Network]

FIG. 12 is a diagram illustrating a second exemplary configuration (multi-manager) of a multi-hop network of the automatic inspection system 1 according to the first embodiment.

Here, a multi-hop network according to a second exemplary configuration of the automatic inspection system 1 will be described. The automatic inspection system 1 can form a multi-hop network without being provided with the wireless relay 20. To identify the plurality of the wireless base stations 30, an example of a multi-hop network provided with wireless base stations 30(1) and 30(2) labeled by the signs (1) and (2) is illustrated. In other words, in the multi-hop network, the wireless relays 20(1) and 20(2) illustrated in FIG. 11 are replaced by two wireless base stations 30(1) and 30(2). Additionally, the wireless base stations 30(1) and 30(2) are connected to the monitoring terminal 40 through a communication network such as the Internet.

In a multi-hop network, the plurality of wireless endpoints 10 and 10' are capable of forwarding the packet D1. For example, packets D1 from the two wireless endpoints 10(1) and 10(2) are transmitted to the wireless base station 30(1) illustrated on the left side of FIG. 12. Also, packets D1 from the two wireless endpoints 10(3) and 10(4) are transmitted to the wireless base station 30(2) illustrated on the right side of FIG. 12.

However, suppose that pieces of equipment 6 are installed between the wireless base station 30(2) and each of the two wireless endpoints 10(3) and 10(4) illustrated on the right side of FIG. 12, disrupting direct communication between the wireless base station 30(2) and the two wireless endpoints 10(3) and 10(4). In this way, among the plurality of wireless endpoints 10(1) to 10(4), in a case of detecting that the wireless endpoints 10(3) and 10(4) cannot transmit the packets D1 to the wireless base station 30(2), the wireless endpoints 10(3) and 10(4) request the other wireless endpoint 10(2), which is capable of transmitting data to the other wireless base station 30(1), to forward the packets D1.

Accordingly, the wireless endpoints 10(3) and 10(4) which cannot transmit the packets D1 to the wireless base station 30(2) search for the wireless endpoints 10(1) and 10(2) capable of transmitting the packets D1 to the other wireless base station 30(1). The wireless endpoints 10(3) and 10(4) which are unable to transmit the packets D1 forward the packets D1 to the wireless endpoint 10(2) which can transmit the packets D1. At this time, the wireless endpoint 10(3) transmits its own packet D1 to the wireless endpoint 10(2) and also forwards the packet D1 transmitted from the wireless endpoint 10(4) to the wireless endpoint 10(2).

Further, the other wireless endpoint 10(2) forwards the packet D1 transmitted from the wireless endpoints 10(3) and 10(4) to the wireless base station 30(1). In other words, the wireless endpoint 10(2) transmits its own packet D1 to the wireless base station 30(1), and in addition, also transmits the packets D1 transmitted or forwarded from the wireless endpoint 10(3) to the wireless base station 30(1). By having the automatic inspection system 1 form a multi-hop network in this way, all of the wireless endpoints 10(1) to 10(4) can transmit the packets D1 to the monitoring terminal 40 via the wireless base station 30(1).

Note that if the wireless endpoints 10(2) and 10(3) continue to forward the packets D1 over a long period, the consumption of power from the built-in battery 58 in the wireless endpoints 10(2) and 10(3) will become higher than the power consumption in the other wireless endpoints 10(1) and 10(4). For this reason, the monitoring terminal 40 may also be notified through the wireless base station 30 of the existence of the wireless endpoint 10(2) that has begun forwarding the packets D1 transmitted from the other wireless endpoints 10(3) and 10(4). Through this notification, the worker is able to learn of the situation in which wireless communication is unavailable between the wireless endpoints 10(3) and 10(4) and the wireless base station 30(2). Thereafter, the worker can take appropriate measures such as moving the wireless endpoints 10(3) and 10(4) to positions that allow communication with the wireless base station 30(2), or moving the equipment 6.

[Third Exemplary Configuration (Multi-Manager) of a Multi-Hop Network]

Figure 13:
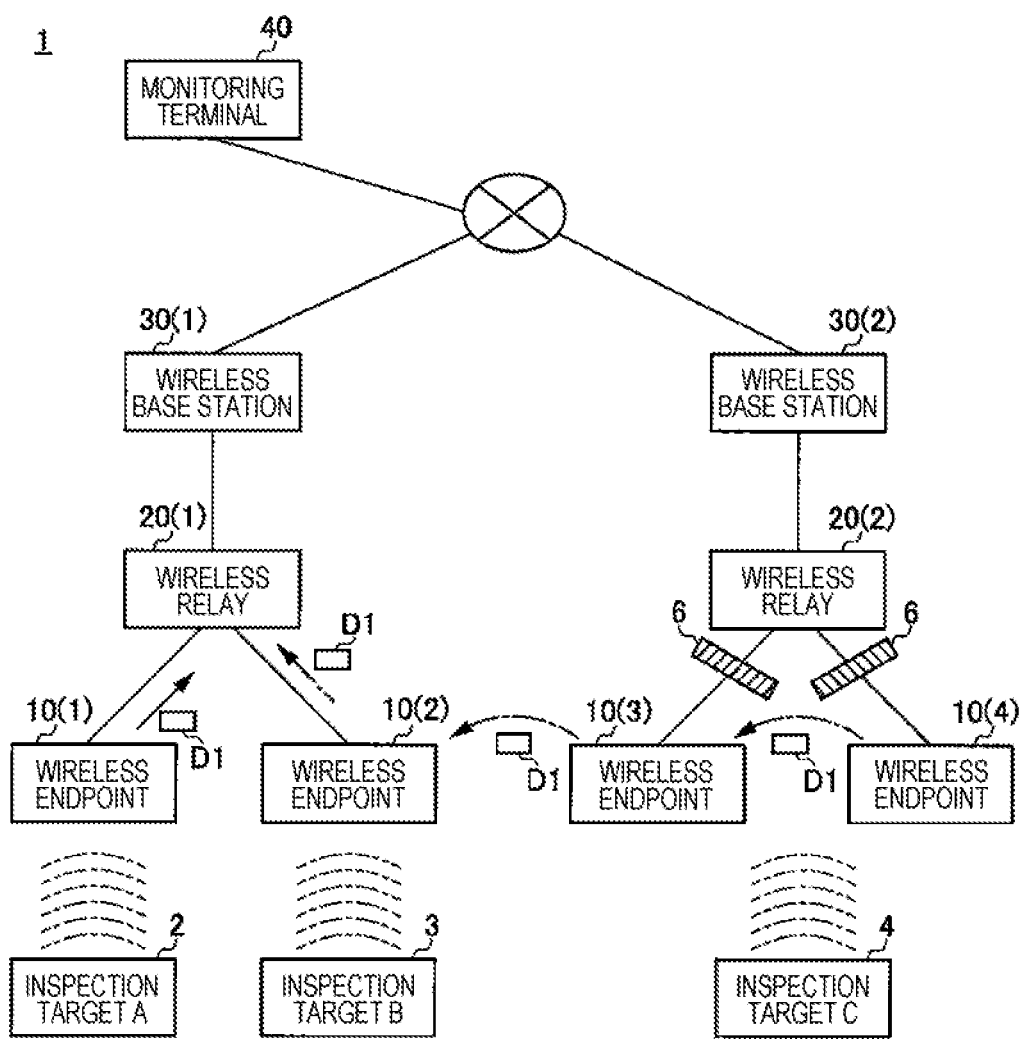
FIG. 13 is a diagram illustrating a third exemplary configuration (multi-manager) of a multi-hop network of the automatic inspection system according to the first embodiment of the present invention.

FIG. 13 is a diagram illustrating a third exemplary configuration (multi-manager) of a multi-hop network of the automatic inspection system 1 according to the first embodiment.

Here, a multi-hop network according to a third exemplary configuration of the automatic inspection system 1 will be described. In the multi-manager configuration of the multi-hop network according to the second exemplary configuration illustrated in FIG. 12, the wireless relay 20 may also be included as illustrated in FIG. 13.

The automatic inspection system 1 illustrated in FIG. 13 can form a multi-hop network with being provided with the plurality of the wireless relays 20 and the plurality of the wireless base stations 30. In the multi-hop network, the wireless relay 20(1) is connected to the wireless endpoints 10(1) and 10(2), and the wireless relay 20(2) is connected to the wireless endpoints 10(3) and 10(4). Additionally, the wireless relay 20(1) and the wireless base station 30(1) are connected, and the wireless relay 20(2) and the wireless base station 30(2) are connected. Additionally, the wireless base stations 30(1) and 30(2) are connected to the monitoring terminal 40 through a communication network such as the Internet.

In the multi-hop network according to the third exemplary configuration, suppose that pieces of equipment 6 are installed between the wireless endpoints 10(3) and 10(4) and the wireless relay 20(2), disrupting direct communication between the wireless relay 20(2) and the two wireless endpoints 10(3) and 10(4). In this case, the wireless endpoints 10(3) and 10(4) search for the other wireless endpoint 10(2). Additionally, the wireless endpoint 10(4) transmits the packet D1 to the wireless endpoint 10(3). The wireless endpoint 10(3) transmits the packet D1 created by the wireless endpoint 10(3) itself to the wireless endpoint 10(2) and also forwards the packet D1 received from the wireless endpoint 10(4) to the wireless endpoint 10(2). Thereafter, the wireless endpoint 10(2) forwards the packets D1 to the wireless relay 20(1), thereby causing the packets D1 of the wireless endpoints 10(3) and 10(4) to be transmitted from the wireless relay 20(1) to the wireless base station 30(1), and transmitted from the wireless base station 30(1) to the monitoring terminal 40 through the communication network.

By having the automatic inspection system 1 form a multi-hop network according to the third configuration in this way, all of the wireless endpoints 10(1) to 10(4) can transmit the packets D1 to the monitoring terminal 40 via the wireless relay 20(1) and the wireless base station 30(1). Note that to prevent continued forwarding of the packets D1 over a long period, a process of notifying the monitoring terminal 40 that the wireless endpoints 10(2) and 10(3) have begun forwarding the packets D1 is similar to that of the multi-hop network according to the first exemplary configuration.

Second Embodiment

Next, an exemplary configuration and exemplary operation of the automatic inspection system according to the second embodiment of the present invention will be described with reference to FIG. 14.

Figure 14:
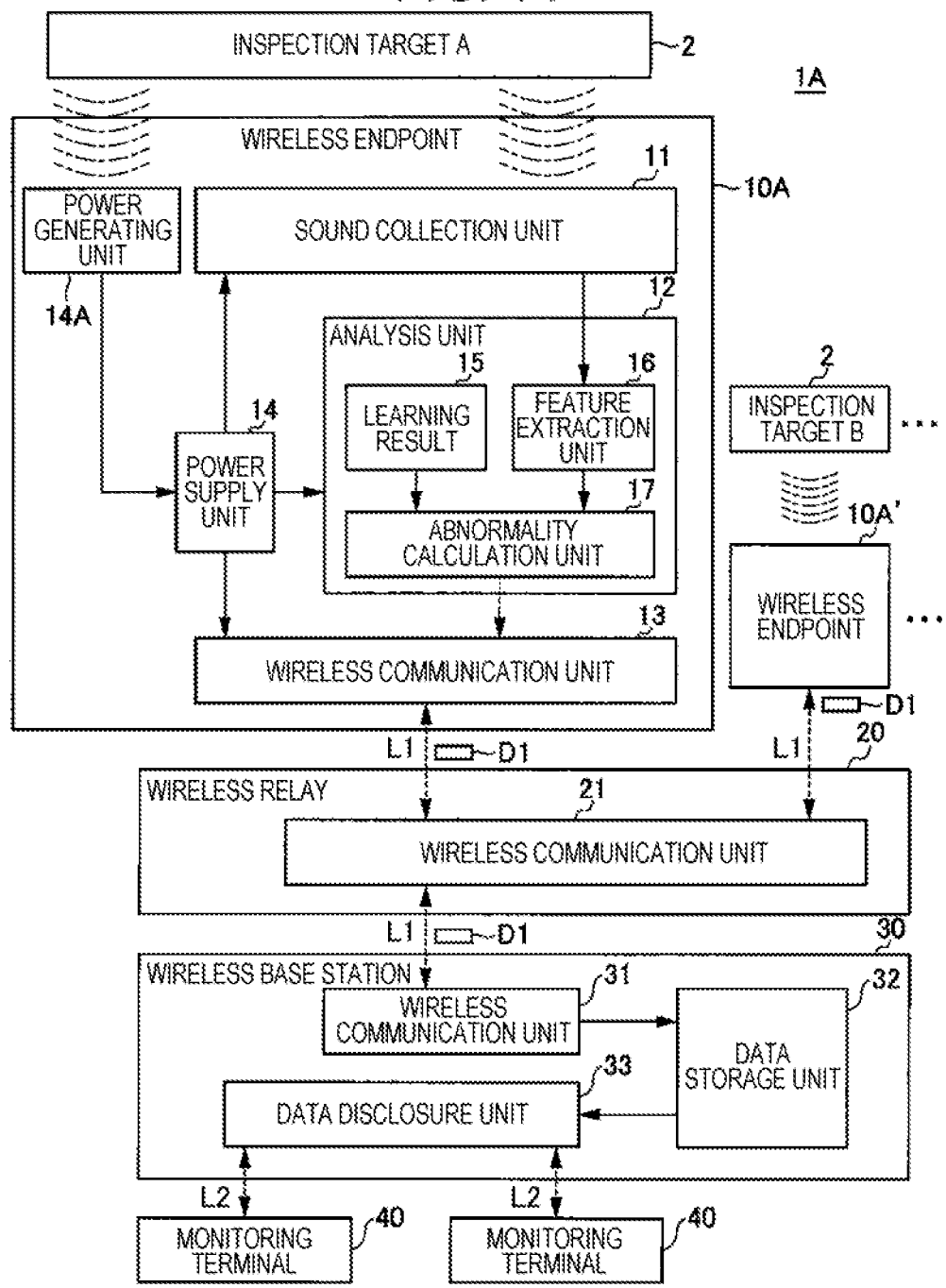
FIG. 14 is a block diagram illustrating an example of an overall configuration of an automatic inspection system according to a second embodiment of the present invention.

FIG. 14 is a block diagram illustrating an example of a configuration of an automatic inspection system 1A according to the second embodiment. In the present embodiment, by providing a power generating unit 14A in the wireless endpoint 10, it is possible to moderate depletion of the built-in battery 58 in the power supply unit 14. Note that a detailed description of the wireless endpoint 10A' having a configuration similar to the wireless endpoint 10A as well as a detailed description of the same components as the wireless relay 20, the wireless base station 30, and the monitoring terminal 40 according to the first embodiment are omitted.

The wireless endpoint 10A according to the second embodiment is additionally provided with the power generating unit 14A. The power generating unit 14A is a device that includes a piezoelectric vibrator, for example, and generates power by converting vibrations due to sound waves emitted from the inspection target A2 or vibrations produced by the inspection target A2 into electrical energy (power). The power generated by the power generating unit 14A is supplied to the power supply unit 14.

The power supply unit 14 can supply (feed) both the power supplied from the power generating unit 14A and power retrieved from the built-in battery 58 to the sound collection unit 11, the analysis unit 12, and the wireless communication unit 13. By configuring the built-in battery 58 as a rechargeable secondary battery, the power supply unit 14 may also charge the built-in battery 58 with the power generated by the power generating unit 14A. Also, in the case where the power from the power generating unit 14A alone is insufficient, the power supply unit 14 may also supply power from the built-in battery 58 to each unit of the wireless endpoint 10. The power generating unit 14A may generate power in any way. For example, the power generating unit 14A may also be a power generating device that converts sunlight into electrical energy (power). However, the method of generating power preferably utilizes energy such as sounds and vibrations originating from the inspection target A2.

The automatic inspection system 1A according to the second embodiment exhibits operations and effects similar to the automatic inspection system 1 according to the first embodiment. Furthermore, in the automatic inspection system 1A according to the second embodiment, because the wireless endpoint 10 is provided with the power generating unit 14A, the replacement frequency of the built-in battery 58 can be lowered compared to the built-in battery 58 in the wireless endpoint 10 according to the first embodiment.

The present invention is not limited to the embodiments described above, and various other application examples and modifications can be made without departing from the scope of the present invention described in the claims. Each configuration element of the present invention can arbitrarily be selected and discriminated, and an invention including a selected and discriminated configuration is also included in the present invention. Further, the configurations described in the claims can be combined with combinations other than the combinations explicitly described in the claims, and the configurations and processing methods of the embodiments can be appropriately changed within the scope of achieving the object of the present invention.

In addition, the control lines and information lines in the drawings indicate what is considered necessary for explanation, and do not necessarily indicate all the control lines and information lines in the product. In practice, it may be assumed that almost all the components are interconnected.

What is claimed is:

1. A automatic inspection system comprising:
a wireless endpoint; a wireless base station; and a monitoring terminal, wherein
the wireless endpoint includes
a sound collection unit that collects a sound produced by an inspection target,
an analysis unit that analyzes the collected sound and obtains a degree of difference between the collected sound and a normal sound learned in advance as an analysis result,
a wireless communication unit that wirelessly transmits data including the analysis result to the wireless base station, and
a power supply unit that supplies power to the sound collection unit, the analysis unit, and the wireless communication unit,
the wireless base station receives and manages the data from the wireless endpoint, and in response to a request from the monitoring terminal that monitors a status of the inspection target, transmits the analysis result retrieved from the data to the monitoring terminal, and
the monitoring terminal performs a process of determining and disclosing the status of the inspection target from the analysis result,
the analysis unit includes:
a feature extraction unit that extract a feature of the sound produced by the inspection target,
a learning result of the sound of the inspection target operating normally, and
an abnormality calculation unit that calculates a degree of difference between the feature extracted from the sound collected by the sound collection unit and the learning result, and
the abnormality calculation unit calculates an average of abnormality of the inspection target, and a positive and negative standard deviations with respect to the average of abnormality.

2. The automatic inspection system according to claim 1, wherein
in a case where the average of abnormality and the standard deviation of abnormality computed from the analysis result both rise over a predetermined period or longer, the wireless base station notifies the monitoring terminal that an abnormality has occurred in the inspection target.

3. The automatic inspection system according to claim 2, wherein
in a case where the average of abnormality and the standard deviation of abnormality are predetermined values or higher, the wireless base station determines that the analysis unit has incorrectly detected an abnormality in the inspection target, and in a case where the average of abnormality and the standard deviation of abnormality are less than predetermined values, the wireless base station determines that the analysis unit has correctly detected an abnormality in the inspection target, and in a case of determining that the analysis unit has correctly detected an abnormality in the inspection target, the wireless base station notifies the monitoring terminal that an abnormality has occurred in the inspection target.

4. The automatic inspection system according to claim 1, wherein
the sound collection unit outputs a digital signal of the sound collected from the inspection target, and
the wireless communication unit wirelessly transmits the analysis result addressed to the wireless base station at a predetermined timing by adding destination information indicating the wireless base station to the analysis result obtained by the analysis unit.

5. An automatic inspection system comprising:
a wireless endpoint a wireless base station; and a monitoring terminal, wherein
the wireless endpoint includes
a sound collection unit that collects a sound produced by an inspection target,
an analysis unit that analyzes the collected sound and obtains a degree of difference between the collected sound and a normal sound learned in advance as an analysis result,
a wireless communication unit that wirelessly transmits data including the analysis result to the wireless base station, and
a power supply unit that supplies power to the sound collection unit, the analysis unit, and the wireless communication unit,
the wireless base station receives and manages the data from the wireless endpoint, and in response to a request from the monitoring terminal that monitors a status of the inspection target, transmits the analysis result retrieved from the data to the monitoring terminal, and
the monitoring terminal performs a process of determining and disclosing the status of the inspection target from the analysis result,
the sound collection unit outputs a digital signal of the sound collected from the inspection target, and
the wireless communication unit wirelessly transmits the analysis result addressed to the wireless base station at a predetermined timing by adding destination information indicating the wireless base station to the analysis result obtained by the analysis unit, wherein
the sound collection unit is separable from the wireless endpoint and attachable to the inspection target, operates under power supplied by the power supply unit through a power line drawn out from the wireless endpoint, and outputs the digital signal through a signal line drawn out from the wireless endpoint.

6. The automatic inspection system according to claim 5, wherein
the wireless endpoint is provided with a power generating unit that converts vibrations due to sound waves emitted from the inspection target or vibrations produced by the inspection target into power, and
the power supply unit supplies the power generated by the power generating unit to the sound collection unit, the analysis unit, and the wireless communication unit, or charges a battery built into the wireless endpoint.

7. The automatic inspection system according to claim 6, further comprising:
a wireless relay, disposed between the wireless base station that instructs a plurality of wireless endpoints about a transmission order of data including the analysis result and the wireless endpoints, that wirelessly transmits the data received from the wireless endpoints in accordance with the transmission order to the wireless base station.

8. The automatic inspection system according to claim 7, wherein
among the plurality of wireless endpoints, in a case where a first wireless endpoint detects an inability to transmit the data including the analysis result to a first wireless relay, the first wireless endpoint requests a second wireless endpoint capable of transmitting data to a second wireless relay to forward the data including the analysis result, and
the second wireless endpoint forwards the data including the analysis result transmitted from the first wireless endpoint to the first wireless relay.

9. The automatic inspection system according to claim 6, wherein
among the plurality of wireless endpoints, in a case where a first wireless endpoint detects an inability to transmit the data including the analysis result to the wireless base station, the first wireless endpoint requests a second wireless endpoint capable of transmitting data to the wireless base station to forward the data including the analysis result, and
the second wireless endpoint forwards the data including the analysis result transmitted from the first wireless endpoint to the wireless base station.

10. A wireless endpoint comprising:
a sound collection unit that collects a sound produced by an inspection target,
an analysis unit that analyzes the collected sound and obtains a degree of difference between the collected sound and a normal sound learned in advance as an analysis result,
a wireless communication unit that wirelessly transmits data including the analysis result; and
a power supply unit that supplies power to the sound collection unit, the analysis unit, and the wireless communication unit,
the analysis unit includes:
a feature extraction unit that extract a feature of the sound produced by the inspection target,
a learning result of the sound of the inspection target operating normally, and
an abnormality calculation unit that calculates a degree of difference between the feature extracted from the sound collected by the sound collection unit and the learning result, and
the abnormality calculation unit calculates an average of abnormality of the inspection target, and a positive and negative standard deviations with respect to the average of abnormality.

* * * * *